(12) United States Patent
Coffin et al.

(10) Patent No.: US 8,961,112 B2
(45) Date of Patent: Feb. 24, 2015

(54) TORQUE FRAME BUSHING ARRANGEMENT FOR GAS TURBINE ENGINE FAN DRIVE GEAR SYSTEM

(75) Inventors: James B. Coffin, Windsor, CT (US); Richard E. Domonkos, Wethersfield, CT (US); Sunil Sharma, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 508 days.

(21) Appl. No.: 13/429,671

(22) Filed: Mar. 26, 2012

(65) Prior Publication Data

US 2013/0251511 A1    Sep. 26, 2013

(51) Int. Cl.
    *F16H 1/28*    (2006.01)
(52) U.S. Cl.
    USPC .............. 415/122.1; 416/170 R; 475/331; 475/346
(58) Field of Classification Search
    CPC .... F05D 2260/40311; F16H 1/28; F16H 1/32
    USPC ............ 415/122.1; 416/170 R; 475/331, 337, 475/346
    See application file for complete search history.

(56) References Cited

U.S. PATENT DOCUMENTS

| | | | |
|---|---|---|---|
| 2,591,743 A * | 4/1952 | Thompson | 475/346 |
| 5,096,375 A | 3/1992 | Ciokailo | |
| 5,466,198 A | 11/1995 | McKibbin et al. | |
| 5,472,059 A | 12/1995 | Schlosser et al. | |
| 5,472,383 A | 12/1995 | McKibbin | |
| 6,139,464 A | 10/2000 | Roske | |
| 6,758,598 B2 | 7/2004 | Beauvais et al. | |
| 6,855,089 B2 * | 2/2005 | Poulin et al. | 475/331 |
| 7,011,599 B2 | 3/2006 | Becquerelle et al. | |
| 7,104,918 B2 | 9/2006 | Mitrovic | |
| 7,214,160 B2 | 5/2007 | Illerhaus | |
| 7,484,354 B2 | 2/2009 | Stretton | |
| 7,704,178 B2 | 4/2010 | Sheridan et al. | |
| 2008/0273961 A1 | 11/2008 | Rosenkrans et al. | |
| 2009/0145102 A1 | 6/2009 | Roberge et al. | |
| 2010/0327109 A1 | 12/2010 | Dooley et al. | |
| 2013/0195604 A1 * | 8/2013 | Otto | 415/1 |

OTHER PUBLICATIONS

International Search Report and Written Opinion for International Application No. PCT/US2013/033036 completed on Sep. 12, 2013.
International Preliminary Report on Patentability for International Application No. PCT/US2013/033036 completed on Oct. 1, 2014.

* cited by examiner

*Primary Examiner* — Ninh H Nguyen
(74) *Attorney, Agent, or Firm* — Carlson, Gaskey & Olds, P.C.

(57) ABSTRACT

A fan drive gear system for a gas turbine engine includes a carrier that supports circumferentially arranged gears. A torque frame has circumferentially arranged fingers with each finger including a bore having a bore axis. A bushing is arranged in each bore and provides an aperture. At least one bushing has a bushing axis offset from the bore axis. A pin is disposed in the aperture and secures the carrier to the torque frame.

20 Claims, 4 Drawing Sheets

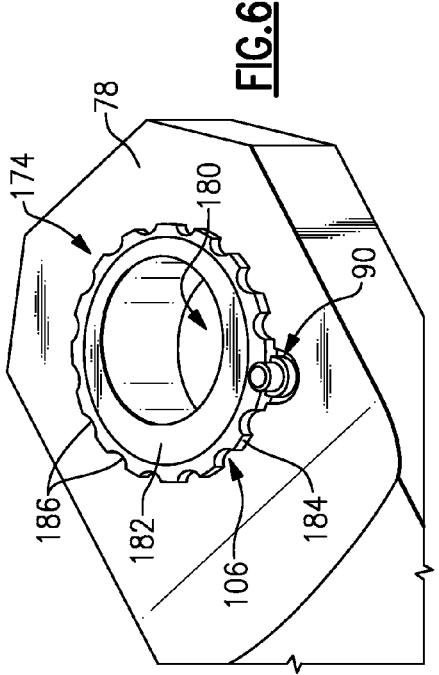
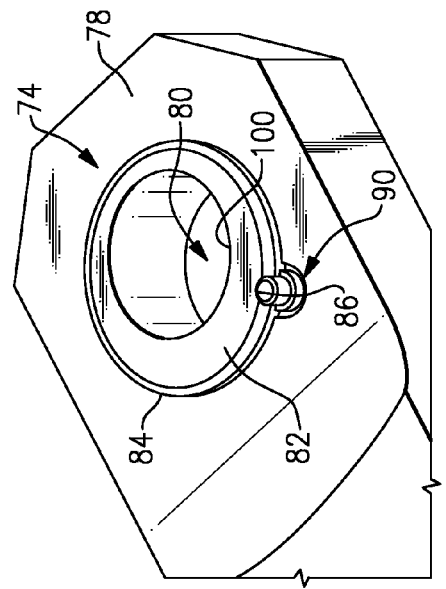
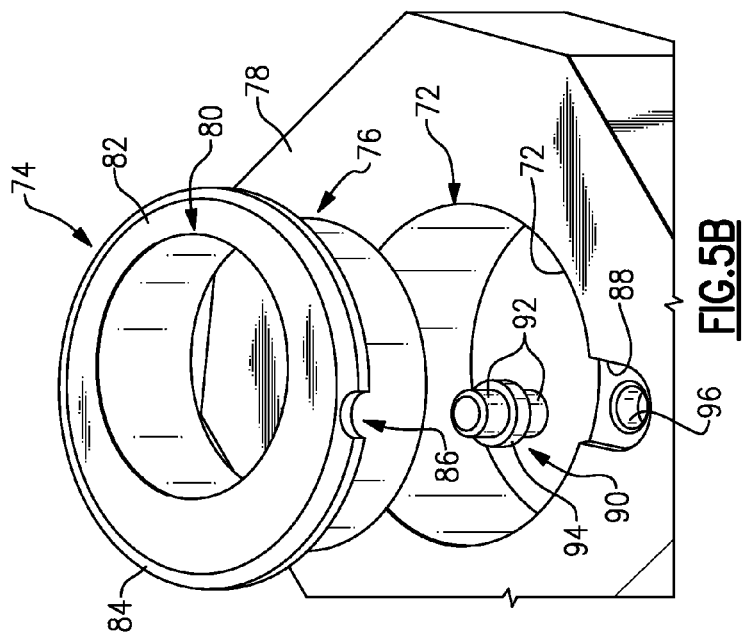

TORQUE FRAME BUSHING ARRANGEMENT FOR GAS TURBINE ENGINE FAN DRIVE GEAR SYSTEM

BACKGROUND

This disclosure relates to a torque frame bushing arrangement for a fan drive gear system, for example, for a gas turbine engine.

One type of epicyclic gear train includes a carrier supporting multiple circumferentially arranged intermediate gears, such as star gears. The intermediate gears intermesh with a centrally located sun gear and a ring gear that circumscribes the intermediate gears. In one type of configuration, a torque frame is used to support the carrier relative to another structure, which may be fixed or rotating.

The torque frame includes multiple axially extending fingers. A bore may be provided in each finger, which receives a pin that secures the carrier to the torque frame. In some applications, it may be desirable to use a bushing in the bore, which receives the pin. The bushing aperture is concentric with the bore. The bores and bushings are machined to very tight tolerances.

SUMMARY

In one exemplary embodiment, a fan drive gear system for a gas turbine engine includes a carrier supporting circumferentially arranged gears. A torque frame has circumferentially arranged fingers. Each finger includes a bore having a bore axis. A bushing is arranged in each bore and provides an aperture. At least one bushing has a bushing axis offset from the bore axis. A pin is disposed in the aperture and secures the carrier to the torque frame.

In a further embodiment of any of the above, the bushing is arranged in a desired position relative to the bore.

In a further embodiment of any of the above, the bushing includes a body having an outer diameter and a flange extends radially outwardly from the body. The flange includes a locating feature that maintains the desired position.

In a further embodiment of any of the above, the locating feature includes at least one notch corresponding to at least one discrete position.

In a further embodiment of any of the above, the flange includes a scalloped periphery that provides multiple notches corresponding to multiple discrete positions.

In a further embodiment of any of the above, a retaining pin is supported on the finger and received by the notch to maintain the desired position.

In a further embodiment of any of the above, the retaining pin includes a collar arranged between opposing ends. The finger includes a recess having a hole. One of the ends is received in the hole with the collar arranged in the recess.

In a further embodiment of any of the above, the flange is arranged over the collar and the bushing is captured within an opening of the carrier.

In a further embodiment of any of the above, the bushing axes are aligned with one another in a common plane. A body has an outer diameter that provides a body axis and a flange extends radially outwardly from the body to a periphery. An aperture extends through the body and the flange and provides an inner diameter having a bushing axis.

In a further embodiment of any of the above, the fan drive gear system includes a sun gear. Star gears are supported by the carrier and a ring gear circumscribes the star gears. The star gears intermesh with the sun gear and the ring gear.

In one exemplary embodiment, a gas turbine engine includes a fan section. A turbine section is coupled to the fan section via a geared architecture. The geared architecture includes a carrier that support circumferentially arranged gears. A torque frame has circumferentially arranged fingers, each finger includes a bore having a bore axis. A bushing is arranged in each bore and provides an aperture. At least one bushing has a bushing axis offset from the bore axis. A pin is disposed in the aperture and secures the carrier to the torque frame.

In a further embodiment of any of the above, the gas turbine engine includes a sun gear. Star gears are supported by the carrier and a ring gear circumscribes the star gears. The star gears intermesh with the sun gear and the ring gear.

In a further embodiment of any of the above, the fan section includes a fan coupled to the ring gear. The turbine section includes a high pressure turbine section and a low pressure turbine section and a low speed spool supports the low pressure turbine section and is coupled to the star gear. The torque frame is grounded to a static structure.

In a further embodiment of any of the above, the bushing axes are aligned with one another in a common plane.

In one exemplary embodiment, a bushing for an epicyclic gear train torque frame includes a body having an outer diameter providing a body axis, and a flange extends radially outwardly from the body to a periphery. An aperture extends through the body and the flange and provides an inner diameter having a bushing axis. The body axis and bushing axis are offset from one another. At least one notch is provided in the periphery corresponding to a desired angular position.

In a further embodiment of any of the above, the flange includes a scalloped periphery that provides multiple notches corresponding to multiple discrete positions. One of the discrete positions provides the desired angular position.

In one exemplary embodiment, a method of assembly an epicyclic gear train comprising the steps of inserting an eccentric bushing into a bore of a torque frame finger, selecting a bushing, arranging the bushing relative to the bore to a desired position, and fixing the busing relative to the bore.

In a further embodiment of any of the above, the method of assembly includes the steps of positioning a carrier relative to the torque frame finger and installing a pin into the bushing to secure the carrier to the torque frame finger.

In a further embodiment of any of the above, the bushing includes an aperture receiving the pin and provides a bushing axis and the arranging step includes positioning the bushing axis of multiple circumferentially arranged bushings in a common plane.

In a further embodiment of any of the above, the method of assembly includes the step of selecting a bushing from a set of bushings having different offsets and inserting the selected bushing.

BRIEF DESCRIPTION OF THE DRAWINGS

The disclosure can be further understood by reference to the following detailed description when considered in connection with the accompanying drawings wherein:

FIG. 5A is a perspective view of a torque frame finger with an example bushing installed.

FIG. 5B is an exploded view of the torque frame and the bushing illustrated in FIG. 5A.

FIG. 6 is a perspective view of another example bushing installed in a torque frame finger.

DETAILED DESCRIPTION

Figure 1:
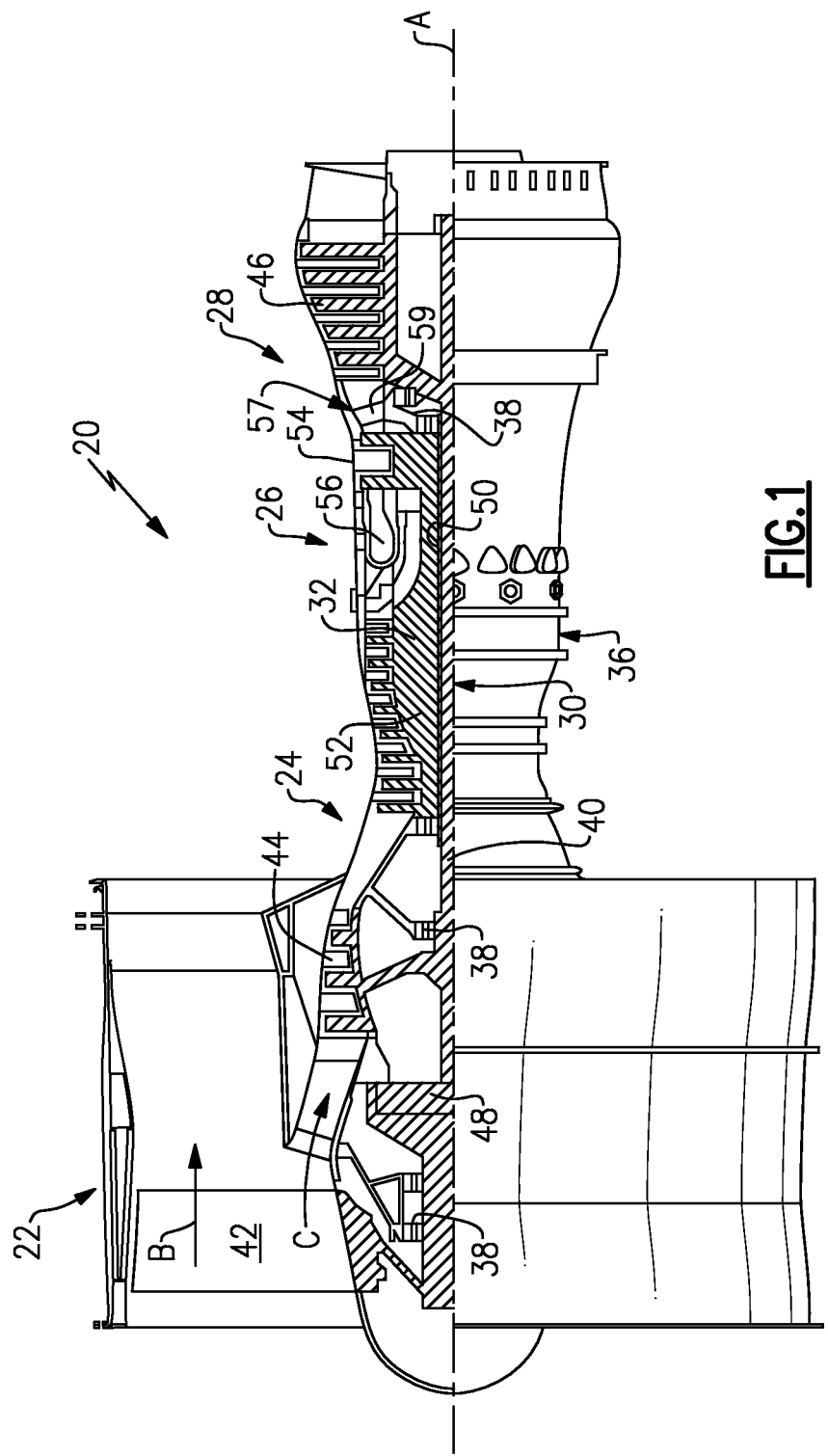
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned per hour divided by 1 bf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
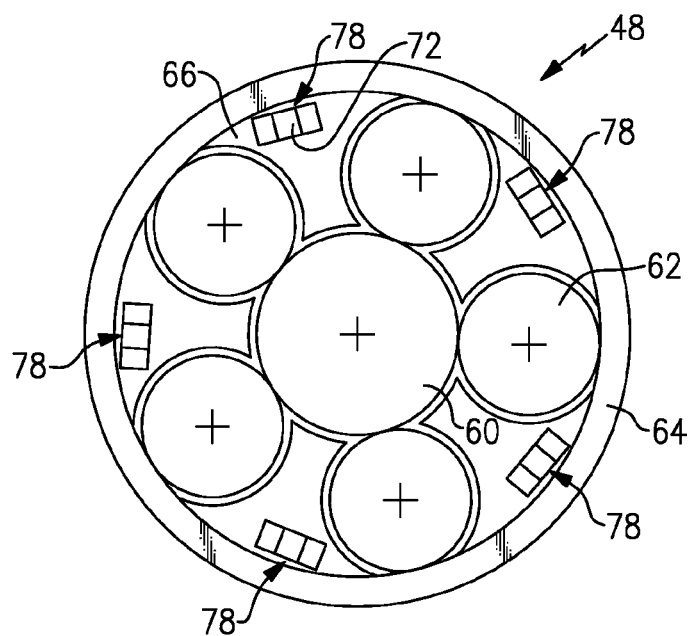
FIG. 2 is a schematic view of an example epicyclic gear train supported by a torque frame.
Figure 3:
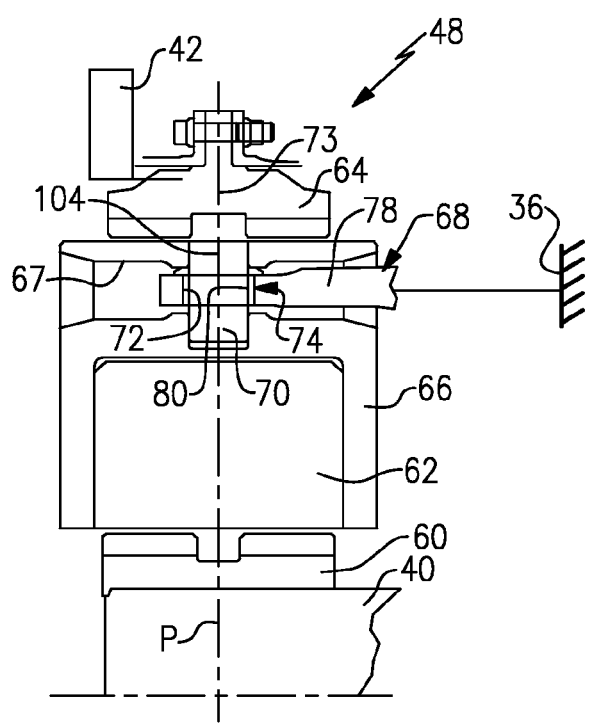
FIG. 3 is a partial cross-sectional view of the gear train illustrated in FIG. 2.

Referring to FIGS. 2 and 3, the geared architecture 48 includes a sun gear 60 coupled to the inner shaft 40. Star gears 62 are arranged circumferentially about and intermesh with the sun gear 60. A ring gear 64 circumscribes and intermeshes with the star gears 62. The ring gear 64 is coupled to the fan 42. The illustrated gear configuration is exemplary, and it should be understood that other arrangement may be used, such as a differential or planetary epicyclic configuration, for example.

Figure 4:
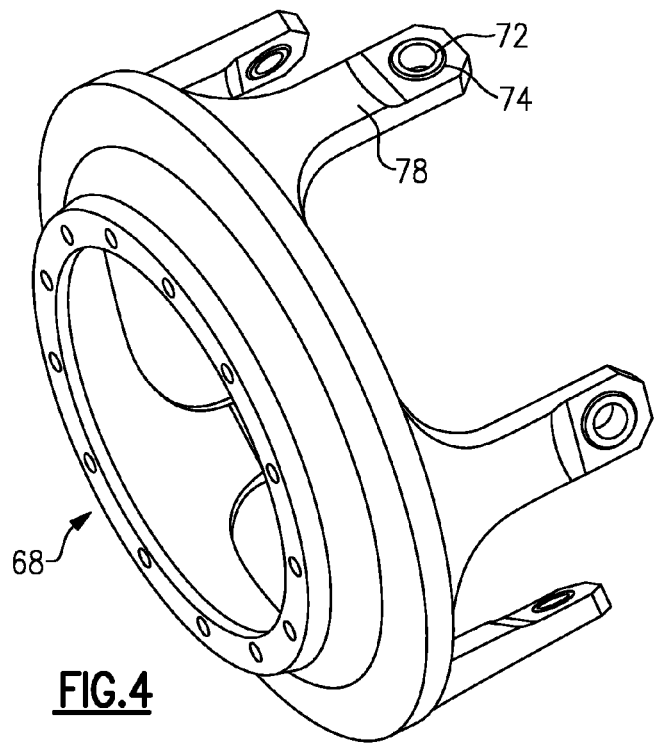
FIG. 4 is a perspective view of an example torque frame.

The star gears 62 are supported by a carrier 66 that is secured to a torque frame 68. The carrier 66 includes multiple circumferentially arranged openings 67 that receive fingers 78 of the torque frame 68 shown in FIG. 4. The fingers 78 include bores 72 having a bore axis 73 that each receive a bushing 74 that is eccentric. The pins 70 are received in an aperture 80 of the bushing 74 and through corresponding holes in the carrier 66, as shown in FIG. 3. The bushing 74 is captured within the opening 67 of the carrier 66.

Figure 7:
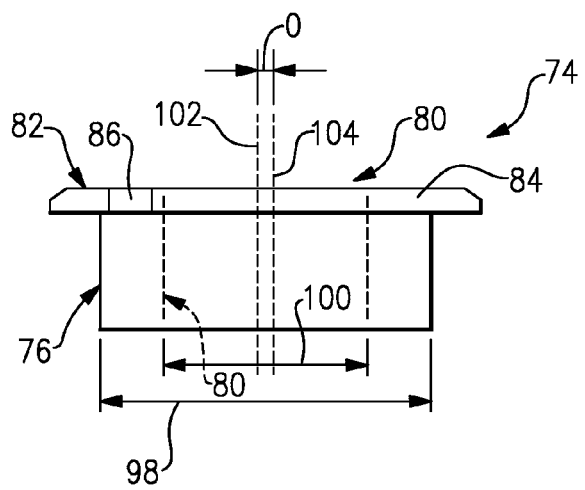
FIG. 7 is a side view of the bushing illustrated in FIGS. 5A and 5B.

Referring to FIGS. 5A, 5B and 7, the bushing 74 includes a body 76. A flange 82 extends radially outward from one side of the body 76. The flange 82 provides a periphery 84 having at least one notch 86 that corresponds to a locating feature. The finger 78 includes a recess 88 having a hole 96. A retaining pin 90 includes opposing ends 92 separated by a collar 94. One end 92 is received in the hole 96, and the collar 94 is received in the recess 88. In one example, the collar 94 is flush with an exterior surface of the finger 78, and the collar 94 is captured beneath the flange 82.

The body 76 includes an outer diameter 98 that provides a body axis 102 that is coaxial with the bore axis 73. The outer diameter 98 is press-fit into the bore 72 in one example. The aperture 80 includes an inner diameter 100 that provides a bushing axis 104. The bushing axis 104 has an offset O from the body axis 102.

It is desirable to provide the bushing axis 104 in a common plane P to provide desired alignment and attachment of the carrier 66 to the torque frame 68 by the pin 70. It may be difficult to machine the bore 72 with the bore axis 73 in the common plane P. Accordingly, the eccentric aperture 80 enables the bushing axis 104 to be placed in a desired position, such as desired axial and circumferential positions. In one example, there may be multiple sets of bushings having different offsets O. During assembly of the gear architecture 48, the manufacturer may select a bushing 74 having the desired offset O to place the bushing axis 104 in the plane P.

Another example bushing 174 having an aperture 180 is illustrated in FIG. 6. The periphery 184 includes a scalloped edge 106 providing multiple notches 186. One of the notches 186 provides a discrete position, which locates the bushing 174 in the desired position. The retaining pin 90 is received by one of the notches 186 in the flange 182 to maintain a desired angular position of the bushing 174 relative to the finger 78. Thus, the bushing 174 may also be used to adjust the bushing axis 102 in a circumferential direction as well as an axial direction.

The bushings 74, 174 may be used to repair or rework out of specification torque frames. In addition to having a bushing bore 76 eccentric to the torque frame finger bore 72, an oversized bushing diameter 76 may be provided to establish or reestablish a tight fit with the torque frame finger bore 72 when the torque frame finger bore 72 is oversized due to manufacturing error, wear, or repair/re-operation.

Although an example embodiment has been disclosed, a worker of ordinary skill in this art would recognize that certain modifications would come within the scope of the claims. For that reason, the following claims should be studied to determine their true scope and content.

What is claimed is:

1. A fan drive gear system for a gas turbine engine, comprising:
   a carrier supporting circumferentially arranged gears;
   a torque frame having circumferentially arranged fingers, each finger including a bore having a bore axis;
   a bushing arranged in each bore and providing an aperture, at least one bushing having a bushing axis offset from the bore axis; and
   a pin disposed in the aperture and securing the carrier to the torque frame.

2. The fan drive gear system according to claim 1, wherein the bushing is arranged in a desired position relative to the bore.

3. The fan drive gear system according to claim 2, wherein the bushing includes a body having an outer diameter, and a flange extends radially outwardly from the body, the flange includes a locating feature maintaining the desired position.

4. The fan drive gear system according to claim 3, wherein the locating feature includes at least one notch corresponding to at least one discrete position.

5. The fan drive gear system according to claim 4, wherein the flange includes a scalloped periphery providing multiple notches corresponding to multiple discrete positions.

6. The fan drive gear system according to claim 4, comprising a retaining pin supported on the finger and received by the notch to maintain the desired position.

7. The fan drive gear system according to claim 6, wherein the retaining pin includes a collar arranged between opposing ends, the finger includes a recess having a hole, one of the ends received in the hole with the collar arranged in the recess.

8. The fan drive gear system according to claim 7, wherein the flange is arranged over the collar, and the bushing is captured within an opening of the carrier.

9. The fan drive gear system according to claim 1, wherein the bushing axes are aligned with one another in a common plane, a body having an outer diameter providing a body axis, and a flange extends radially outwardly from the body to a periphery, an aperture extending through the body and the flange and providing an inner diameter having a bushing axis.

10. The fan drive gear system according to claim 1, comprising a sun gear, star gears supported by the carrier, and a ring gear circumscribing the star gears, the star gears intermeshing with the sun gear and the ring gear.

11. A gas turbine engine comprising:
    a fan section;
    a turbine section coupled to the fan section via a geared architecture, the geared architecture including:
       a carrier supporting circumferentially arranged gears;
       a torque frame having circumferentially arranged fingers, each finger including a bore having a bore axis;
       a bushing arranged in each bore and providing an aperture, at least one bushing having a bushing axis offset from the bore axis; and
       a pin disposed in the aperture and securing the carrier to the torque frame.

12. The gas turbine engine according to claim 11, comprising a sun gear, star gears supported by the carrier, and a ring gear circumscribing the star gears, the star gears intermeshing with the sun gear and the ring gear.

13. The gas turbine engine according to claim 12, wherein the fan section includes a fan coupled to the ring gear, and the turbine section includes a high pressure turbine section and a low pressure turbine section, and a low speed spool supporting the low pressure turbine section and coupled to the star gear, the torque frame grounded to a static structure.

14. The gas turbine engine according to claim 11, wherein the bushing axes are aligned with one another in a common plane.

15. A bushing for an epicyclic gear train torque frame comprising:
    a body having an outer diameter providing a body axis, and
    a flange extends radially outwardly from the body to a periphery, an aperture extending through the body and the flange and providing an inner diameter having a bushing axis, the body axis and bushing axis offset from one another, at least one notch provided in the periphery corresponding to a desired angular position.

16. The bushing according to claim 15, wherein the flange includes a scalloped periphery providing multiple notches corresponding to multiple discrete positions, one of the discrete positions providing the desired angular position.

17. A method of assembly an epicyclic gear train comprising the steps of:
    inserting an eccentric bushing into a bore of a torque frame finger;
    selecting a bushing;
    arranging the bushing relative to the bore to a desired position; and
    fixing the busing relative to the bore.

18. The method according to claim 17, comprising the steps of positioning a carrier relative to the torque frame finger, and installing a pin into the bushing to secure the carrier to the torque frame finger.

19. The method according to claim 18, wherein bushing includes an aperture receiving the pin and providing a bushing axis, and the arranging step includes positioning the bushing axis of multiple circumferentially arranged bushings in a common plane.

20. The method according to claim 17, comprising the step of selecting a bushing from a set of bushings having different offsets, and inserting the selected bushing.

* * * * *